Feb. 28, 1961   E. L. HOLTSFORD   2,973,016
MEANS FOR SECURING INSULATING MATERIAL ABOUT A DUCT
Filed May 19, 1958   2 Sheets-Sheet 1
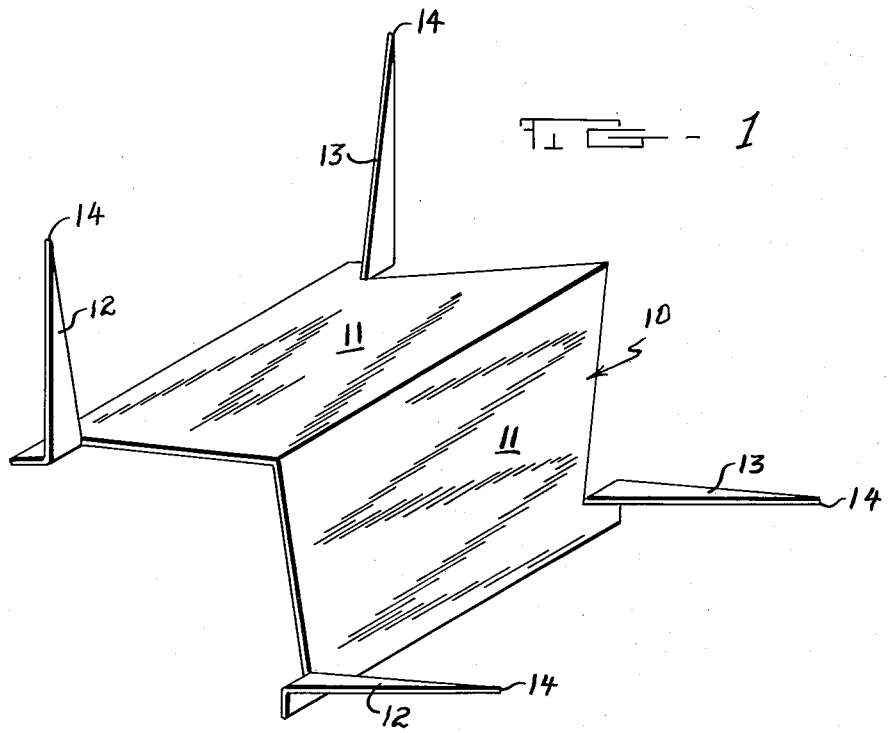
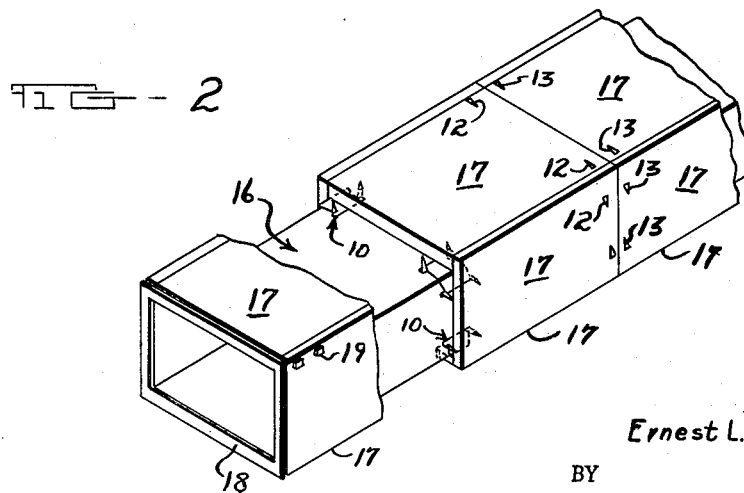
INVENTOR.
Ernest L. Holtsford
BY
Jennings, Carter & Thompson
Attorneys

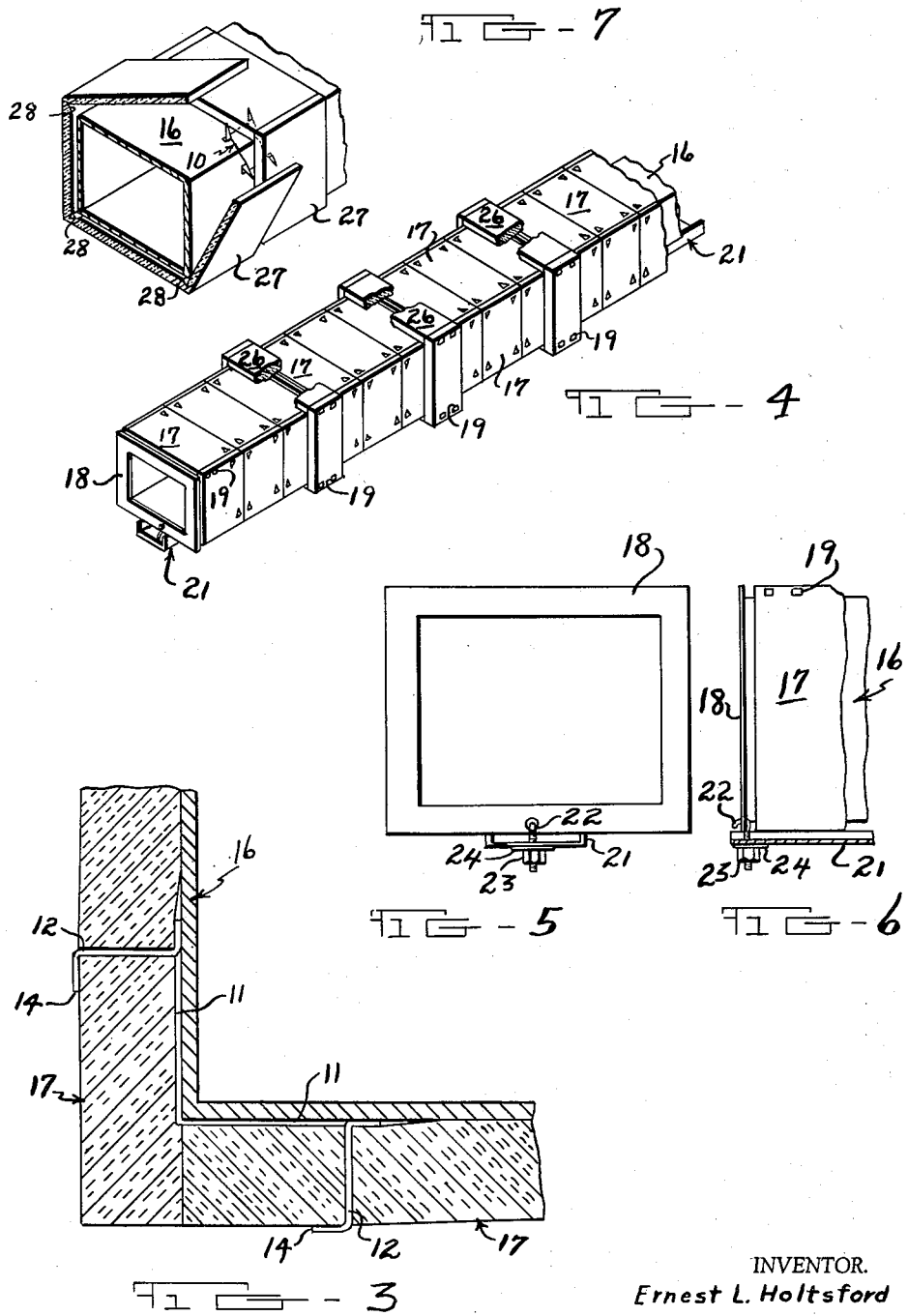

United States Patent Office 2,973,016
Patented Feb. 28, 1961

2,973,016

MEANS FOR SECURING INSULATING MATERIAL ABOUT A DUCT

Ernest L. Holtsford, % Badham Insulation Co., 1909 1st Ave. S., Birmingham, Ala.

Filed May 19, 1958, Ser. No. 736,269

2 Claims. (Cl. 138—64)

This invention relates to means for securing sheet insulating material about a duct and more particularly to such means by which the duct may contract and expand relative to the insulating sheets and the securing means while the sheets maintain an air tight relation about the duct.

Heretofore, it has been very difficult to maintain an air tight relation in the insulating sheets about a duct due to the expansion and contraction of the duct. This has been due to the fact that the securing means for the insulating sheets has been fixed to the ducts and upon expansion or contraction of the ducts, the securing means moved also, thereby either moving the insulating sheets or moving relatively to the insulating sheets and breaking the air tight relation. It is highly desirable to maintain an air tight relation as air leaking about the insulating sheets causes condensation on the duct which results in deterioration of the insulating sheets and precipitation.

A common prior means was the use of studs spot welded to the ducts with the insulating sheets secured to the studs. Upon expansion of the duct, the studs moved relatively to the insulating sheets and enlarged holes were formed thereby in the insulating sheets which allowed air to leak about the holes thereby causing condensation of moisture. In the event the insulating sheets moved with the studs, the adhesive bond between adjacent aligned sheets was broken which allowed air to leak through the joint of adjoining insulating sheets. All other means of which I am aware employ securing means for the insulating sheets which means are secured to the duct in some manner.

My invention contemplates positioning the securing means for the insulating sheets at the corners of the duct in unsecured contact relation thereto so that the duct may contract and expand relative to the securing means thereby maintaining an air tight relation and preventing the condensation of moisture about the duct. The securing means merely rests against the sides of the duct without being secured thereto in any manner and comprises an angle member with a pair of securing elements or prongs extending outwardly from each of the legs of the angle member. A pair of aligned adjacent insulating sheets is placed over each of the pairs of prongs and the prongs are bent against the outer surface of the insulating sheets for holding the sheets in position on the duct. If the insulating sheets are placed on a rectangular duct of a relatively large width, support means are provided for the sheets on the bottom side of the rectangular duct to keep the sheets from bowing or sagging thereon.

It is an object of the present invention to provide means for securing sheet insulating material about a duct without the use of any securing means affixed to or secured to the duct whereby the duct moves relatively to the securing means and the insulating sheets upon expansion or contraction of the duct thereby maintaining an air tight relation about the duct and preventing the condensation of moisture thereon.

It is a further object to provide securing means for securing insulating sheets about a duct which means comprises two opposed pairs of securing elements or prongs with each pair of prongs engaging a pair of aligned adjacent insulating sheets.

Apparatus embodying features of my invention is illustrated in the accompanying drawings, forming a part of this application, in which:

Fig. 1 is a perspective view of the securing means forming the present invention;

Fig. 2 is a perspective view of a ventilating and heating duct covered with insulating sheets secured thereto by the securing means shown in Fig. 1;

Fig. 3 is a fragmentary, cross sectional view of a corner of the ventilating and heating duct showing the securing means in position about the corner of the duct and with the ends of the securing means bent downwardly over the insulating sheets;

Fig. 4 is a perspective view of a plurality of duct sections connected to each other and covered with insulating sheets with supporting means arranged on the bottom side of the duct sections for supporting the insulating sheets thereat;

Fig. 5 is an end elevational view of a duct section showing the supporting means on the bottom thereof pivotally connected to the flanges of the duct section;

Fig. 6 is a fragmentary, side elevational view of the duct section shown in Fig. 5 with a portion of the supporting means shown in section; and, Fig. 7 is a perspective view of a modified form of insulating sheets used with the securing means shown in Fig. 1.

Referring now in detail to the drawings for a better understanding of my invention, I show in Fig. 1 the securing means of the present invention comprising a clip member indicated generally by the numeral 10 and having a central portion with a pair of legs 11 arranged in right angular relation to each other. Each of the legs 11 has a pair of securing elements or prongs 12 and 13 arranged adjacent the outer end thereof and extending in a substantially perpendicular relation to the legs 11. The ends of the securing elements 12 and 13 are pointed as indicated by the numeral 14 so as to present a sharp penetrating point for insertion through insulating sheets. The clip member 10 can be formed from a rectangular blank of sheet metal material and thus, there is no wasted material in the stamping of the clip member 10 from the blank as all of the sheet metal material is used.

Referring now to Fig. 2, I show a rectangular heating and ventilating duct section 16 covered on the four outer sides thereof by insulating sheets 17 secured about the duct 16 by my securing means 10. The duct section 16 has outwardly extending flanges 18 extending around the outer ends thereof. The insulating sheets 17 are secured about the duct 16 in the following manner. A clip member 10 is placed on each of the two upper corners of the rectangular conduit 16 and arranged in a plane perpendicular to the longitudinal axis of the duct 16 so that the insulating sheets 17 to be placed thereon will be in proper alignment. The top insulating sheet is then placed over a prong of each of the clip members 10 on the upper side and positioned thereon. Next, a clip member 10 is placed on the two lower corners of the rectangular conduit 16 and the side insulating sheets are disposed in edge abutting relation to the top sheet over a prong of each clip member 10 extending from the sides of the duct 16. Then, the bottom sheet 17 is positioned in transverse alignment with the side sheets 17 over the prongs. The ends 14 of the prongs are then bent downwardly on the outer surface of the insulating sheets 17 to hold the sheets 17 in position about the duct 16. In the installation of the insulating sheets 17, a strip of waterproof adhesive is applied to one of the sheets 17 wherever there is contact between adjacent sheets to maintain the air tight relation. Thus, the inner surface of the side insulating sheets 17 has two strips of adhesive thereon where it contacts the upper and lower insulating sheets. The joints at the end edges of the sheets 17 also have a layer of adhesive thereat. The clip members 10 are normally placed only at the joints of aligned insulating sheets 17 although they may be placed between the joints, if desired. For securing the insulating sheets 17 to each other adjacent the flanges 18, I provide wooden dowel pins or skewers 19 which hold the sheets 17 together until the adhesive sets. Since the insulating material is easily penetrated the skewers 19 can be inserted by hand at the abutment of sheets 17 adjacent flanges 18.

The insulating board or fiber may be of the type sold under the trade name "Styrofoam" manufactured by Dow Chemical Company of Midland, Michigan. Also, fiber glass insulating sheets may be used successfully with the present invention, it being understood that the present invention is not limited in use to any particular type of insulating sheets.

The insulating sheets placed around the duct 16 are of a width from around 12 inches to 72 inches. In the use of ducts 16 having a width of 36 inches or over, insulating sheets 17 arranged on the bottom of the duct 16 tend to sag intermediate the sides thereof. In order to prevent any sagging of the insulating sheets 17 on the bottom of the duct, I provide a longitudinal extending channel member 21 (see Figs. 4–6) formed of a sheet metal material of around 26 gauge in thickness with the web of the channel 21 being approximately 1 inch in width. The channel 21 is supported by hooks 22 pivotally connected to the flanges 18 of the duct 16. The legs of the channel member 21 rest against the outer surface of the sheets 17 on the bottom of the duct 16 and prevent the sheets from sagging. The outer surface of the channel 21 presents a smooth appearance and apertures are provided in the channel to receive the hooks 22 with a nut 23 and washer 24 securing the channel 21 on the hooks 22. The channel 21 extends the length of a plurality of duct sections 16, as many as four or five sections, and is connected at each of the flanges 18 of the duct sections by hooks 22. It is understood that the individual duct sections 16 are connected to each other at the flanges 18, suitable securing means connecting the flanges 18 of adjacent duct members 16 to each other. Since the channels 21 are connected to the duct members 16 by a pivotal connection, expansion or contraction of the duct 16 allows the duct to move relatively to channel member 21. Thus, there will be no relative movement between the channel 21 and the insulating sheets 17 upon expansion or contraction of the ducts 16.

In order to provide a completely air tight construction about the duct 16, as shown in Fig. 4, the outer surfaces of the flanges 18 are substantially flush with the outer surface of the sheets 17 which are disposed adjacent the flanges 18. Joint covering strips 26 of the insulating material are arranged over the flanges 18 and are secured to the insulating sheets by adhesive. Skewers 19 are provided for securing the strips 26 to each other until the adhesive sets. The flanges 18 can thus move between adjacent sheets 17 since neither the sheets 17 nor the strips 26 are secured thereto in any manner.

Referring to Fig. 7, a modified form of insulating board is shown in which the sheet 27 is provided with V-shaped grooves 28 to permit the folding of sheet 27 about a duct 16. The clip members 10 forming my invention secure the side edges of sheet 27 to each other at the joints of adjacent aligned sheets.

From the foregoing, it is evident that I have provided an arrangement whereby a completely air-tight arrangement is secured about an insulating duct 16 and upon expansion or contraction of the duct 16, the insulating sheets will not be affected in any manner and will maintain the air-tight connection about the duct 16 to prevent the condensation of moisture thereat. This is possible since the securing means for the insulation sheets is not connected to the duct and the duct can thereby move relatively to the securing means. Further, I provide support means on the bottom of the duct and pivotally connected thereto to prevent sagging of the sheets arranged on the bottom of the duct. The duct can move relatively to the support means since a pivotal connection is provided between the flanges 18 and the channel members 21.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In combination, a rectangular duct, layers of insulating material covering the four sides of the duct and comprising separate sheets arranged in end-to-end contact relation, the joint formed between the sheets extending about the periphery of the duct and lying in a common plane, a clip member on each of the four corners of the duct at the joint formed by the ends of adjacent insulating sheets, each of the clip members having a pair of connected legs arranged in right angular relation with one leg disposed against one side of the duct and the other leg disposed against an adjacent side of the duct, said clip members being unsecured to the duct and free to move relative thereto, a pair of bendable prongs on each of the legs and extending in a direction generally perpendicular to the leg from which the prongs extend, and each pair of said prongs being inserted through a pair of adjacent contacting insulating sheets and bent downwardly onto the outer surface of the sheets for securing the sheets about the duct with said sheets being unsecured to said duct and having no mechanical attachment thereto, whereby said duct may expand longitudinally relative to the clip members and insulating sheets.

2. In combination, a rectangular duct, layers of insulating material covering the four sides of the duct and comprising separate sheets arranged in end-to-end contact relation, the joint formed between the sheets extending about the periphery of the duct and lying in a common plane, a clip member on each of the four corners of the duct at the joint formed by the ends of adjacent sheets, each of the clip members having a pair of connecting legs arranged in right angular relation with one leg disposed against one side of the duct and the other leg disposed against an adjacent side of the duct, a pair of securing elements on each of the legs and extending in a direction generally perpendicular to the leg from which they extend, each pair of securing elements being secured to a pair of adjacent contacting sheets to hold the sheets on the duct, and said clip members being unsecured to the duct and free to move relative thereto whereby the duct may expand and contract relative to the clip members and insulating sheets.

References Cited in the file of this patent

UNITED STATES PATENTS

| | | |
|---|---|---|
| 1,877,391 | De Bence | Sept. 13, 1932 |
| 2,386,887 | Eckel | Oct. 16, 1945 |
| 2,396,030 | Terry | Mar. 5, 1946 |
| 2,656,902 | Gotshall | Oct. 27, 1953 |
| 2,707,937 | Herman | May 10, 1955 |

FOREIGN PATENTS

| | | |
|---|---|---|
| 302,249 | Switzerland | Dec. 16, 1954 |